I. BAUER.
MILK WARMER.
APPLICATION FILED MAR. 19, 1909.

944,307.

Patented Dec. 28, 1909.

WITNESSES:
Ellen A. Dalton.
R. W. Hevenor

INVENTOR.
I. Bauer,
BY Chas. F. Schmelz
ATTORNEY.

UNITED STATES PATENT OFFICE.

ISAAC BAUER, OF MIDDLETOWN, CONNECTICUT, ASSIGNOR TO THE NEW ENGLAND ENAMELING COMPANY, OF MIDDLETOWN, CONNECTICUT.

MILK-WARMER.

944,307. Specification of Letters Patent. Patented Dec. 28, 1909.

Application filed March 19, 1909. Serial No. 484,439.

*To all whom it may concern:*

Be it known that I, ISAAC BAUER, a citizen of the United States, and resident of Middletown, in the county of Middlesex and State of Connecticut, have invented certain new and useful Improvements in Milk-Warmers, of which the following is a full, clear, and exact specification.

This invention relates to milk warmers such as are commonly used for the purpose of warming bottles which contain milk for children's use, and it has for one of its objects the provision of a device of this character which comprises a plurality of heating devices producing different degrees of temperature, these devices being interchangeable, or adapted to be brought into use as required.

The invention has, furthermore, for its object the provision of means whereby the bottle containing receptacle or hot water reservoir may be bodily removed relatively to the heating flame so as to heat the contents of the reservoir as rapidly or as slowly as may be deemed desirable.

Further objects of the invention reside in the particular organization and construction of some of the elements of the device, as will hereinafter be described and particularly pointed out in the claims.

Figure 1:
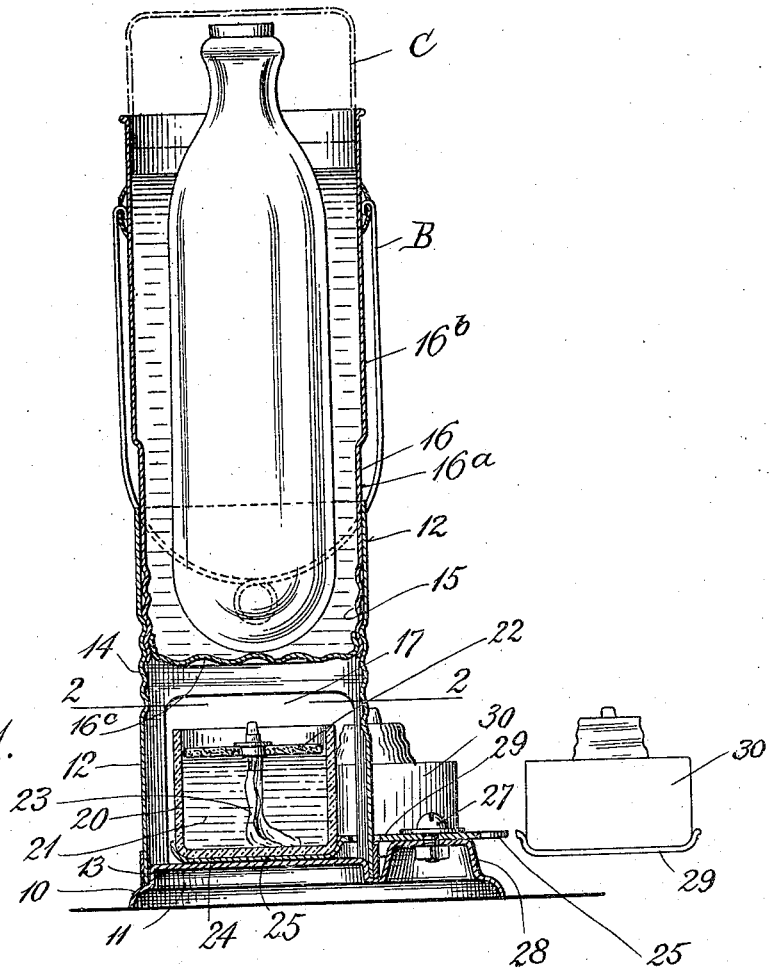
Figure 2:
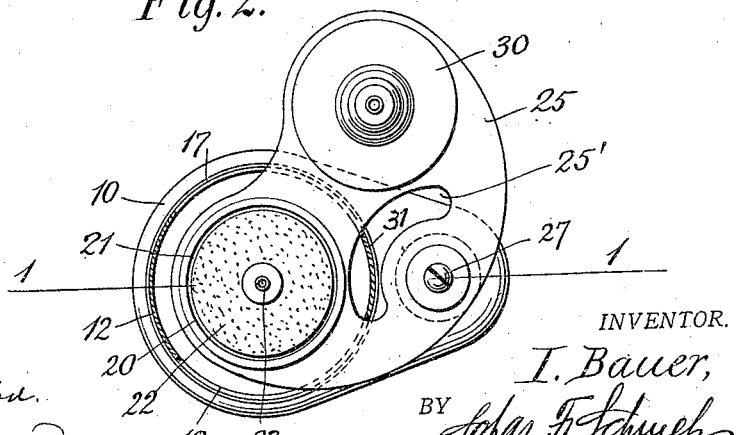

In the accompanying drawings, in which similar characters denote similar parts, Figure 1 represents a central vertical section of my improved milk-warmer as indicated by line 1, 1 in Fig. 2, and Fig. 2 is a horizontal section on line 2, 2 of Fig. 1.

Briefly stated, my improved milk-warmer comprises a burner section and a reservoir adapted to contain water and into which the milk bottle to be warmed is placed and can be readily adjusted vertically so as to bring the bottom of said reservoir closer to, or farther remote from the heating devices which in the present instance consist of an oil lamp and an alcohol lamp both of which are mounted on a plate which may be shifted so as to bring either one of the lamps beneath the reservoir.

In the accompanying drawings, the numeral 10 denotes a base having an upward projection 11 over which the reservoir-holder 12 may be placed and held in place thereon, as for instance by a clamp ring or bead 13. The upper portion of the reservoir-holder 12 is corrugated as at 14 to form screw threads adapted to engage similar corrugations 15 formed on the lower portion of the reservoir 16 so that these two elements may be vertically moved relative to each other by simply turning the reservoir 16 in its holder 12, as will be readily understood. The sides of the holder 12 are cut away as at 17 and 18 to permit the passage in a horizontal plane of a pair of heating devices preferably consisting of an oil-receiving cup 20 into which sperm oil 21 may be placed to support a cork float 23 which latter when lighted will generate light as well as a low degree of heat. The cup 20 is seated in a recess 24 formed in a plate 25 which is pivoted on a stud 27 carried by a boss 28 which is formed on the base plate 10 in the manner shown in Fig. 1. The plate 25 has also another depression 29 (indicated in light lines at the right of Fig. 1) to receive an alcohol lamp 30 which may be of any desired construction.

In the drawings, the oil lamp 20 is illustrated in position beneath the reservoir 16, and, when it is desired to bring the alcohol lamp 30 into this position, the plate 25 may be swung around its pivot 27 by which movement the oil lamp 20 will, of course, be removed from under the reservoir, and in order to avoid interference with this movement, the plate 25 is slotted concentrically as at 25′, thereby enabling the, what may be termed, "leg" 31 of the reservoir-holder 12 to remain in its permanent position on the base, the slot 25′ being, furthermore, of such extent as to serve as a device for limiting the swinging movement of the plate 25 and thus to insure a proper positioning of both lamps, respectively, relatively to the reservoir.

From the foregoing, it will be seen that when it is desired to heat the water in the reservoir quickly, the alcohol lamp may be readily placed in position to produce this result; while the oil lamp produces very little heat but generates sufficient light to serve as a night-light or night-lamp when desired. The adjusting feature of the reservoir relatively to the holder will also apply in this instance as well as in that of the alcohol lamp.

Inasmuch as in general practice the milk bottles to be used in connection with this device, are of comparatively great length, so that the reservoir or bottle-holder must also needs be of considerable height and consequently occupy a great deal of space when the device is packed for shipping purposes, I form the reservoir substantially in the manner shown in Fig. 1 in which the lower portion 16ª is of such diameter as to readily pass into the inside of the holder 12 for a distance sufficient to permit the necessary regulation of the reservoir relatively to the flame beneath it; while the upper portion 16ᵇ of said reservoir is of such size as to adapt the same to pass over and outside of the holder 12 when the reservoir is reversed or turned upside down, in such case the screw threads are, of course, out of engagement with each other, and the total height of the device ready for shipping is considerably decreased.

It will be noted that the bottom 16ᶜ of the reservoir is corrugated and substantially flat so that it can be placed upon a stove when desired and without the necessity of having recourse to the heating devices above described. The reservoir is also provided with a bail B whereby the reservoir may be rotated in its holder, or whereby the reservoir singly or with its holder may be suspended, a feature which adapts my improved milk-warmer especially for traveling on railway cars or on ship board.

In order to avoid an evaporation of the water in the reservoir during the heating process, a cover C may be employed as indicated in dot-and-dash lines in Fig. 1, the size of this cover also being such as to fit over the reservoir bottom when the latter is reversed and packed together with the holder for shipping purposes.

Many changes may be made in the construction and organization of the several elements of my improved device without departing from the spirit of the invention.

I claim:

1. The combination with a reservoir, of a base, a plate supported on said base and carrying a lamp, and means for shifting said plate to bring said lamp under the reservoir, and means for adjusting said reservoir relatively to the base.

2. The combination with a reservoir, and a base therefor, of a plurality of lamps, and a plate supporting said lamps and movable on said base to bring said lamps into coöperation with said reservior, alternately.

3. The combination with a reservoir, and a base therefor, of a plurality of lamps, and a plate supporting said lamps and pivoted on said base to bring said lamps into coöperation with said reservoir, alternately.

4. The combination with a reservoir, and a base therefor of a plurality of lamps, and a plate supporting said lamps and pivoted on said base to bring said lamps into coöperation with said reservoir, alternately, and means for adjusting said reservoir relatively to the base.

5. The combination with a reservoir, having a screw thread, and a support therefor, and also having a screw thread for coöperation with the screw threads of the reservoir, of a base secured to said support, a plate pivoted on said base to swing in a horizontal plane, a lamp held on said plate, and means for limiting the movement of said plate to position said lamp relatively to the reservoir.

6. The combination with a reservoir, a holder therefor having openings at opposite sides thereof, and a base secured to said holder, of a plurality of lamps adapted to pass through said openings, respectively, a plate supporting said lamps and pivoted on said base to swing in a horizontal plane, and having a slot straddling a portion of said holder and for limiting the movement of said plate in opposite directions.

7. The combination with a base having a projection, a cylindrical support mounted thereon, and having cut away portions at opposite sides thereof to form legs, and means for holding said legs on said base, of a reservoir supported for vertical movement in said holder, a pair of lamps adapted to generate heat of different temperatures, respectively, a plate for holding said lamps and pivoted on said base to swing in a horizontal plane, and means for limiting the movement of said plate in both directions.

8. The combination with a holder, a plate shiftable relatively thereto, and a lamp on said plate, of a reservoir comprising a bottom portion adapted to enter said holder, and also comprising an enlarged upper portion adapted to pass over said holder when reversed.

ISAAC BAUER.

Witnesses:
JOHN W. LEAHY,
WALTER V. LANDECK.